Figure 1:
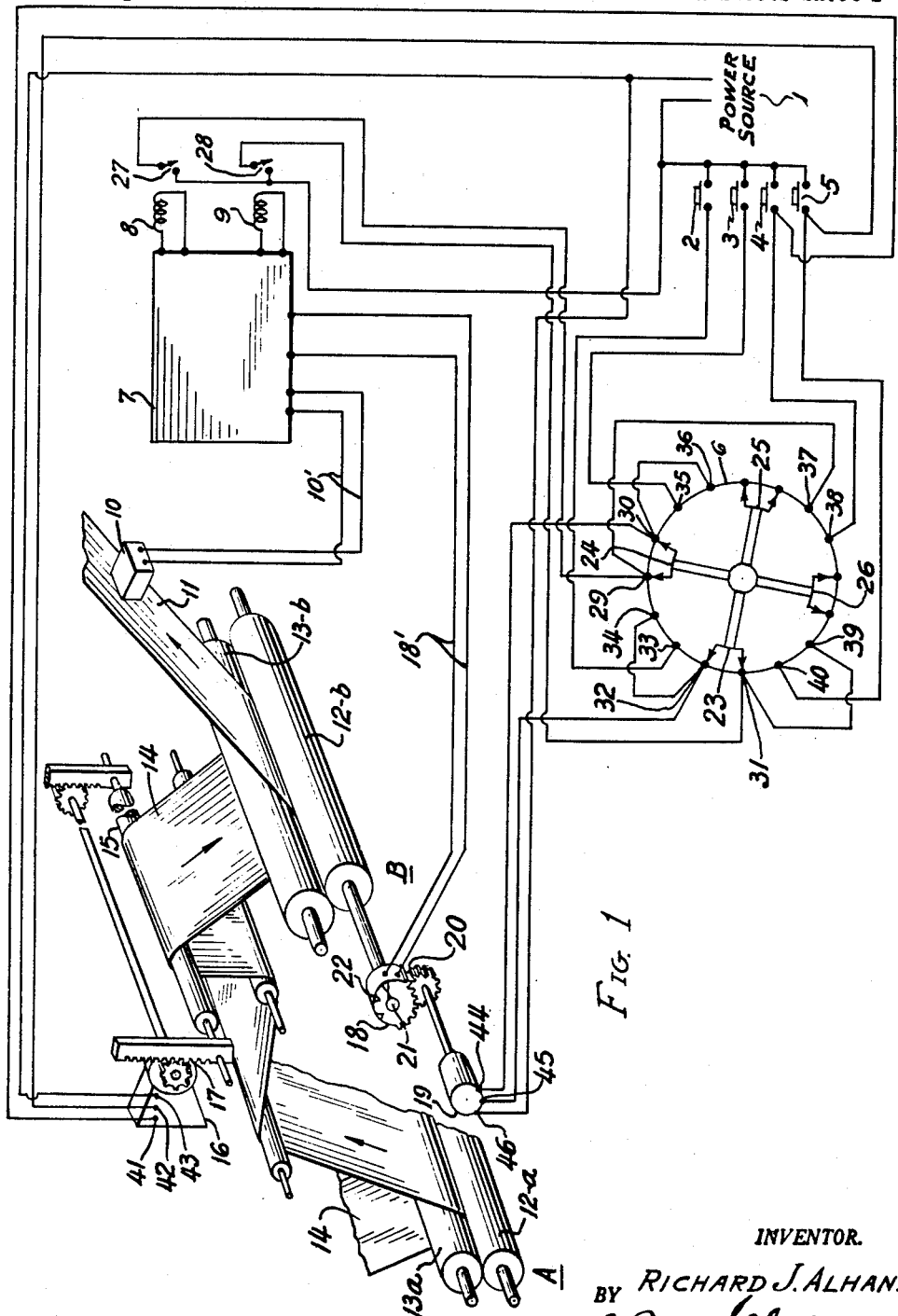

June 24, 1958  R. J. ALHAND  2,840,372
AUTOMATIC CONTROL SYSTEM
Filed Aug. 4, 1955  2 Sheets-Sheet 2

INVENTOR.
RICHARD J. ALHAND
BY Kenneth Swartwood
ATTORNEY

United States Patent Office 2,840,372
Patented June 24, 1958

2,840,372

AUTOMATIC CONTROL SYSTEM

Richard J. Alhand, Danville, Ill., assignor, by mesne assignments, to Electric Eye Equipment Company, Danville, Ill., a corporation of Illinois Application August 4, 1955, Serial No. 526,383

7 Claims. (Cl. 271—2.6)

This invention relates to improvements in automatic controls of the type in which work performed on a moving object is kept in a substantially fixed position with respect to work previously performed on the same object in one or a plurality of preceding steps. A good example of such automatic control will be found in multi-color printing operations, where each color printed after the first color is kept in register with the preceding colors. Another example will be found in blanking, forming, creasing, slitting, perforating, embossing, and cut-off operations and the like performed on a sheet of continuous web of paper, boxboard, foil, sheet metal or the like in substantially fixed relation with one or more preceding operations, such as printing, for example, performed on the same sheet or web.

In operations of the type above mentioned it is common practice to control the process manually until the desired results are obtained with respect to the "register" of the operation or operations to be automatically controlled with the preceding operational step or steps. Then, after the desired conditions are established, the automatic control equipment is brought into operation to maintain the register prevailing at the time. This procedure is relatively simple when only one operation is automatically controlled. In most instances, however, there are a plurality of automatically controlled steps in each of which register varies while the equipment is being manually controlled. It is thus necessary to bring each operation into register with the proceeding step, or with the first step, one at a time. This procedure is rendered time-consuming and is often confusing, particularly to an inexperienced operator, because of the fact that changes in the condition of register in any one step alters the condition of register in other steps. This makes it difficult to set up ideal register conditions throughout the entire operation before going on automatic control.

One of the primary objects of the invention is to simplify the set-up procedures above outlined by providing improvements in the automatic control system whereby the number of adjustments which the operator must make before bringing the equipment into automatic control is materially reduced and the possibility of setting-up in such a manner that poor results are obtained on automatic control is minimized.

Another salient object of the invention is to reduce the waste of material being processed. This is accomplished both by minimizing the possibility of error, due to the human element, and by shortening the time necessary to obtain good register and go on automatic control after start-up.

A further object of the invention is to reduce the training period required for operators of the automatic control equipment by so simplifying the set-up procedure that it is easy to understand and follow without confusion.

Another object of the invention is to improve the quality of the results obtained on automatic control (i. e., the quality of the work turned out in the printing or other process). This is achieved by reducing the possibility of error in judgment on the part of the operator and by making it possible for the operator to readily improve register conditions whenever it becomes necessary without turning the equipment off of automatic control while this is being done.

To more concretely illustrate the objects and advantages of the invention it will now be described as applied to the automatic control of color register in printing. It should be understood, however, that the invention is not limited to this particular application. Numerous other advantageous applications of its features to other forms of automatic control equipment will be readily apparent to those familiar with automation.

The automatic control of circumferential register in multi-color printing presses is commonly accomplished by comparison of signals related to consecutive printing operations and using the comparison error for correction or compensation for mis-register. For example, a web of paper or other material passing through the press is impressed at consecutive printing stations with four colors respectively, usually yellow, red, blue and black. The impression is in most cases achieved through the use of etched cylinders which need be changed for each run, and obviously the impressions from each cylinder must register perfectly to give the desired color effect. Considering two consecutive stations, the first station may print a mark at some predetermined place on the web, and this mark is scanned by a first monitoring device such as for example a photo-electric scanner which is located adjacent the second station. The scanner produces a signal which is applied to a comparator, which is some form of amplifier, discriminator or the like. At the second station a second monitoring device is located which also produces a signal, but this second signal must relate to the impression printed at the second station. This second signal is also applied to the comparator.

For ideal conditions, the two printed impressions being in perfect registration, the monitoring devices are so adjusted that the signals in the comparator coincide. When the signals do not coincide, the comparator produces an error signal used to drive some kind of compensating means. The error signal may be proportional to the amount by which the monitor signals fail to coincide, and it is related to the polarity of occurrence, that is to say—if the order of occurrence of the signals in non-coincidence is caused by lag of the second color impression, the error signal should drive the compensating means in one direction, and if caused by lead of the second color impression, the error signal should drive the compensating means in the opposite direction.

Compensating means usually take one of two forms. One form is embodied in a device for adjusting the length of the web between the two printing stations, such as for example—electric, hydraulic or pneumatic motors changing the positions of idler rollers under the control of said error signals. A second form is embodied in similarly driven motors adjusting planetary gearing driving printing cylinders.

The above described structure is well-known in the art and takes many different forms, all of which may be used in the practice of the invention herein.

Most usually the second monitoring device consists of magnetic pulse generator or mechanical contact making device similar to the timer or distributor on an internal combustion engine. This pulse generator is mechanically coupled with the etched printing cylinder of the second printing station, and thus, each time there is a change in the printing cylinder, the circumferential relationship of the position at which the desired signal is produced and the impression by the print cylinder must be re-adjusted. Heretofore this adjustment was accomplished manually during preparation of the press for a run. (This is known as "set-up" of the press.) Basically my invention enables automatic adjustment of relationship of the monitoring signals by automatically adjusting the physical relationship of the signal-producing means for in-register condition.

A description of how the monitor signals were caused to coincide for in-register condition in prior structures will aid in an understanding of the invention. This follows:

(1) After the paper has been threaded through the many rollers and past the printing cylinders (webbing the press) the press is started and, for any printing stage consisting of two consecutive printing stations, the operator manually adjusts the compensating device for in-register condition ascertained visually. During this first step, no automatic equipment is operating. The compensating motors are energized by push-button switches controlling power circuits.

(2) Now that the consecutive printing cylinders of the two stations of the stage are perfectly aligned to print registered impressions, it is necessary to adjust the signal-producing means or monitoring means to give coincident signals. This is usually done by manually rotating the second monitoring devices with respect to the printing cylinder with which it is associated until both the signals from the first and second monitoring means occur simultaneously. This is ascertained by lights, meters, oscilloscopes or the like. Modern presses have motors for accomplishing the manual rotation of the second monitoring means through the use of push-button switches, usually positioned at the main control panel remote from the actual physical structure.

(3) In the meantime, of course, the press has still been running, and paper has been passing through the same. The manually established condition of register may have therefore varied slightly while the second step was being executed, and hence another manual adjustment of the compensating means may be required, which of course throws off the relationship of the monitoring signals so that the operator must go through steps 1 and 2 alternately until the best condition of both register and signal coincidence occur simultaneously.

(4) When the best possible condition of register and signal coincidence occur simultaneously, the operator can finally operate those switches or controls which connect the automatic register control apparatus for operation of the press.

The above outlined procedure is not only time consuming, but is also wasteful of paper, ink and power. Furthermore it calls for utmost skill on the part of the operator. An important disadvantage is that the best possible condition of registration is that prevailing at the time the two monitoring signals coincide just before automatic operation is commenced.

It is emphasized that this same procedure must be followed for each printing stage, and for any folding, cutting or other stages following the printing.

The invention has as an important object the elimination of the waste and loss of time associated with the above procedure in the setting up of multi-color printing presses, and as well the elimination of much of the skill required as well as the achievement of excellent in-register condition. This last advantage is achieved, because in this invention, there is no less of time as there is in the prior art structures between the last manual adjustment of visual in-register condition and the adjustment for signal coincidence. In the prior art, this time, small as it may be at the hands of skilled operators, is a period at which the press is running uncontrolled and unobserved. The very last adjustment of signal coincidence by the operator presumes that his previous visually observed condition of registration has not changed, which may not be true.

According to my invention, a compensation device similar to those described above is used; similar automatic register control apparatus is used; and similar power driven means for adjusting the physical relationship between the signal-producing means is also used. The difference lies in the interconnection between the parts. Instead of making the adjustment of the in-register condition of the press during set-up independently of the signal-producing means, the manual in-register adjustment is used in a novel way for automatically adjusting the physical relationship between the two monitoring devices or signal-producing means so that while in-register condition is being manually set into the press, simultaneously signal coincidence is being achieved.

The above is accomplished in the following manner: During set-up of the press, the compensating device is disconnected from the comparator to be independently controlled by suitable push-buton switches. The two monitoring devices still apply their signals to the comparator, but now the output of the comparator is used to energize means adjusting the physical relationship between the two monitoring devices. For example, the error signal output of the comparator is used to drive a motor which in turn rotates the second monitoring device one way or the other on the second printing cylinder shaft. So long as there is an error signal, the monitoring signals are not coincident and the physical adjustment of monitoring devices will continue to be made, and this will stop when the signal coincidence is achieved. If the operator, therefore, manually adjusts the compensating device for in-register condition, spending all of his observing powers achieving the best visual condition of register, the signal coincidence will occur automatically.

The reaction of the motors driving the second monitoring device is quite rapid, and hence, as the operator is achieving manual in-register condition the signal-coincidence will follow very closely for any condition of registration. Thus, when the operator is satisfied by visual observation that he has achieved the best manual in-register condition, he merely disconnects the comparator from the motor driving the second monitor means and connects it with the compensating means. This is easily done by turning a single rotary switch. The effect is to make the press automatic insofar as registration is concerned, since in this final automatic condition, the error signal from the comparator will act to vary the length of web between the two printing stations of the stage, or vary the gearing driving one of the printing cylinders. After the automatic registration apparatus has been set into operation, the only control of the driving motor associated with the second monitoring means may be achieved by switching circuits independent of the comparator and its associated circuitry.

The apparatus with which the invention is associated may take various forms, and the manner of achieving the desired results may also vary. Thus, for example, instead of adjusting the position of the second monitoring means with relation to the second printing cylinder, the apparatus may be so arranged as to adjust the position of the first monitoring means to change the time at which the first signal occurs. This could be done by physically moving the photoelectric scanner one way or the other along the web.

My device can be better understood by referring to the accompanying drawings. In the drawings, Fig. 1 is a schematic illustration of one embodiment of the invention with the selector switch 6 shown in "automatic set-up" position which will subsequently be explained, and Figs. 2 and 3 respectively show the selector switch 6 in the "manual operation" position and the "automatic operation" position, both of which will also be explained hereinafter.

At the outset it is desired to point out that the system of automatic registration control illustrated is of the type described in U. S. Patent 2,518,325. By means of my invention such a system can also operate as an automatic device for adjusting monitor signals during press set-up periods. The structure which is known, therefore, need not be described in too great detail.

Referring to Fig. 1, a single stage of a multi-color printing press is illustrated, together with diagrammatic representations of other elements of the known automatic registration control apparatus. The printing stage comprises a first printing station A which includes a first printing cylinder 12–a and a back-up roller 13a, and a second printing station B which includes a second printing cylinder 12–b and a second back-up roller 13–b. The web of paper 14 is intended to travel at high speed through the press, past the two printing stations consecutively. The direction of movement of the web 14 is shown by means of arrows. Between stations there are usually provided dryers, idler and guide rollers, and much additional equipment it is not necessary to illustrate. Several idler rollers are shown.

The cylinders 12–a and 12–b are provided with etched matter so that ink may be transferred from suitable inking devices (not shown) onto the bottom surface of the web 14. Impressions from the cylinders 12–a and 12–b are thus to coincide, and if this coincidence, or registration, as it is known, is not achieved, the resulting composite will be blurred and not satisfactory. Such registration can be obtained by compensation means, such as an idler roller 15 which if moved vertically will change the length of web 14 subtended between stations A and B.

The compensating roller 15 is mounted, for example, on racks 17 which can be moved up or down through the medium of a motor 16. As stated the motor may be pneumatic, hydraulic, or electric in character, but the control therefor is preferably electrical, as indicated by three terminals 41, 42 and 43. In the case illustrated these terminals may lead to any simple reversible electric motor. Manual control is obtained through push-button switches 4 and 5 which can be depressed to connect the power source 1 to drive the reversible electric motor one direction or the other, thereby raising or lowering the compensating roller 15.

For registration control, the compensating roller 15 is raised or lowered automatically. To accomplish this, the first printing cylinder 12–a applies a printed mark 11 on the web 14, and this mark is scanned at the second station B by means of a first monitoring device 10. This may take the form of a photoelectric scanner whose optical system is directed at the bottom of the web 14. Passage of the mark 11 results in a signal being produced and this signal is applied to the computer or comparator 7 by way of leads 10′. This signal is termed the first signal or first monitoring signal, hereinafter. In addition, there is a second monitoring device, which takes the form here of a pulse producing device 18 coupled to rotate with the second printing cylinder 12–b and cause a second signal to be produced each time the rotating element 21 passes the non-rotating element 22. This is described in said Patent 2,518,325. This second signal is also applied to the comparator 7 by way of leads 18′.

The two signals are thus fixedly related to the respective impressions produced, and conveniently, they are desired to coincide when the impressions are perfectly registered. Presume for the moment that this is the case. The output of the comparator is in the form of an error signal, which will be zero when the first and second signals coincide. When one or the other occurs first, there will be an error signal which will energize either one of relays 8 or 9 depending upon which signal occurs first. In this way, lead or lag of the second impression relative the first will cause the closing of the switch 27 or 28. For automatic registration control, the switches 27 and 28 are connected to energize the electric motor or motors which operate the control device 16 which in turn raises or lowers compensating roller 15. This condition requires connections such as illustrated in Fig. 3.

Figure 3:
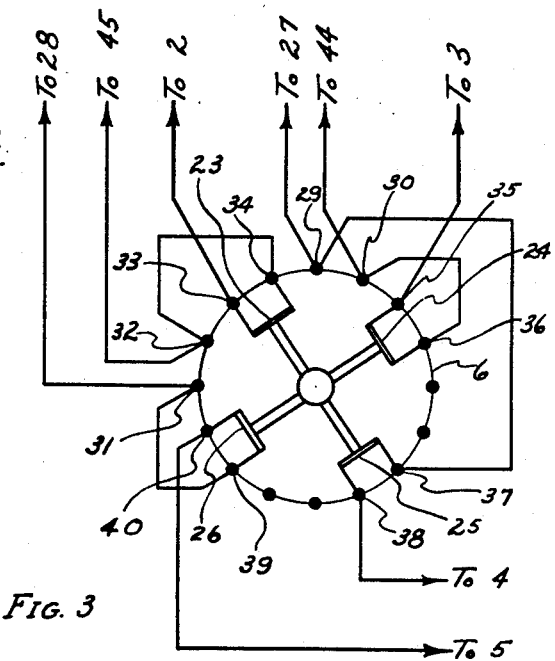

The switch 6 is shown in "automatic operation" position in said Fig. 3, and the resulting connections with the respect to the comparator relay switches 27 and 28, and the terminals 41, 42, and 43 are known, and have been made, perhaps using other switches. Thus, the common side of the relay switches 27 and 28 connects to one side of the power source, and the other side connects directly with the terminal 43 which may be the common terminal of the reversing motor in the compensating device. The other side of switch 27 connects with terminal 29 and is jumped to terminal 37 which is bridged by the shorting bridge 25 to terminal 38. Contact terminal 38 is connected to the left hand terminal of the push-button switch 4 which is always connected with terminal 41. In like manner the second side of relay switch 28 is connected to terminal 42, the circuit being: right contact of switch 28, terminal 31, terminal 39, shorting bridge 26, terminal 40, left hand terminal of push-button switch 5, terminal 42.

Any error signal from comparator 7 will thus operate the compensating device until registration is achieved.

As previously explained when printing cylinders 12–a or 12–b are changed, the first and second signals will not usually coincide at the in-register condition. It is necessary to physically adjust the position of the two monitoring means 10 and 18 to cause signal coincidence. Of course, only one device need be moved, and conveniently it is the pulse device 18. By shifting the fixed element 22 circumferentially this can be done. Such shifting may be done locally by manual movement or from some remote location, such as the control panel. Where accomplished from a remote location, there is provided a reversible motor 19 with a suitable gear train 20 mechanically coupled to the pulse producing device 18. Terminals 44, 45 and 46 of the motor 19 are connected by suitable leads to push button switches 2 and 3 so that the power source 1 may be used by the operator to drive the motor 19 forward or backward to adjust the position of the fixed element 22 with respect to the rotating element, and hence the occurrence of the second signal with respect to the impression obtained from the second printing cylinder 12–b.

It is not suitable for the automatic registration equipment to be energized during the adjustment of the monitoring device 18, and hence the switch 6 cannot be in the so-called "automatic operation" position of Fig. 3, but must be in a position where the registration can be adjusted manually. It is recalled that the discussion still contemplates the prior systems, and hence the adjustment of the monitoring means 18 is also to be accomplished manually. The condition of the connections is somewhat as shown in Fig. 2 which provides for independent manual operation of the compensation device and the adjustment of the circumferential position of the first monitoring device 18.

Figure 2:
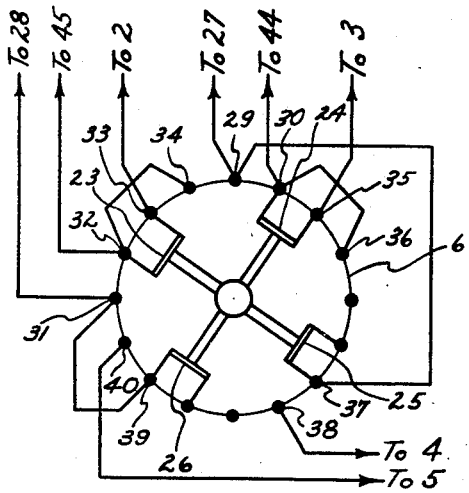

In said Fig. 2, which is referred to as "manual operation position" the terminals 38 and 40 which are connected with the left hand terminals of the push-button switches 4 and 5 respectively are open. The push-button switches 4 and 5 are however directly connected with the compensating device motor and can be used to raise or lower the roller 15. The push-button switches 2 and 3 have their left hand terminals connected respectively to the terminals 33 and 35 respectively and thence, by way of suitable connections to the terminals of the motor 19. The circuit for the terminal 33 comprises: bridge 23, terminal 32 and terminal 45. The circuit for the terminal 35 comprises: bridge 24, terminal 30, and terminal 44. The contacts of the relay switches 27 and 28 are dead-ended as will be seen by examination of the terminals 29, 37, 31, 39 and others. Therefore, the comparator is not being used.

With the connections established as described (not necessarily with the use of a switch like 6) the steps described previously and designated 1, 2 and 3 are accomplished during the set-up period of the press. These connections, such as shown in Figs. 2 and 3, still do not provide the advantages of the invention, since the difficulties described hereinbefore are met.

In order to use the invention herein, means are provided which enable the various elements of the system as described to be connected in accordance with the electrical circuits of Fig. 1 and preferably this is accomplished through the use of a multiple position switch such as diagrammatically illustrated and designated 6, connected so that there are at least the three positions shown in Figs. 1, 2 and 3 achieved by simply rotating the switch.

The position of the switch 6 in Fig. 1 is designated "automatic set-up" position. It is used only during the set-up period. Through the use of the connections which will specifically be described, and which are shown, the compensating device 16 is connected only to the manually operable push-button switches 4 and 5; the manually operable push-button switches 2 and 3 are electrically disconnected from the circuit; and the output of the comparator 7 is used to operate the motor 19. This means that the error signal caused by the first and second signals not coinciding is used to rotate the normally fixed element 22 of the second monitoring device until such coincidence is achieved.

This provides means for simplifying the set-up of the press. With the switch 6 in the position shown in Fig. 1, the press is started, and the operator brings the impressions of the cylinders 12–a and 12–b into registration by visual observation of the compmosite, using manually controlled push-button switches 4 and 5. While he is doing this, the comparator is energizing either the relay 8 or 9 to close the switches 27 or 28 and keeping the first and second signals coincident. When the best condition of registration is observed, the switch 6 is merely thrown back to "automatic operation" position as shown in Fig. 3, thereby changing the connection between the comparator output and the adjustment motor 19 to be re-established between the comparator output and the compensating device 16. This is done without any loss of time, and the coincidence of signals will thereafter represent the last condition of registration at the time of switching.

The circuits from the comparator output to the adjustment motor are described for Fig. 1: relay switch 27, terminal 29, bridge 24, terminal 30, terminal 44; and relay switch 28, terminal 31, bridge 23, terminal 32 and terminal 45. Terminal 46 which is a common return is directly connected to one side of the power source.

It will be appreciated that the position of the switch 6 which is illustrated in Fig. 2 is used only in setting up the press manually, as described in connection with the prior systems, and hence is not necessary to the invention. It gives a degree of flexibility to the apparatus, and may on occasion find utility.

I claim:

1. An automatic control system for maintaining in-register condition between two separate operations performed by a machine on a moving web consecutively at locations spaced along the web, and including first and second signal producing means normally responsive during the operation of the machine to produce first and second signals the occurrence of which have a predetermined relation with the respective operations whereby for in-register condition the signals are concurrent, means for continuously comparing the signals and their relative occurrence and providing an error signal output as a function of mis-register, mis-register correcting means, first electrical connecting means between said comparing means and mis-register correcting means whereby to control said mis-register correcting means by said error signal and automatically adjust the relative positions at which said operations are performed on the web to maintain in-register condition of said operations, signal aligning means for adjusting the physical space relationship of said signal producing means relative to one another with respect to said web whereby to vary the said predetermined relation of the occurrence of said first and second signals, second electrical connecting means between said comparing means and said signal aligning means normally inoperative during the automatic control of register, switch means for rendering said second connecting means operative during a set-up period to enable said error signal to automatically control said signal aligning means, said switch means simultaneously rendering said first connecting means inoperative, and means for manually controlling said mis-register correcting means while said second connecting means is operative whereby manual establishment of in-register condition will automatically operate said signal aligning means until there is concurrence of said first and second signals during said set-up period.

2. An automatic control system for maintaining in-register condition between separate operations performed successively on a moving web at locations spaced along its path of travel, and including first and second signal producing means responsive, respectively, to the occurrence of said successive operations and producing first and second signals which occur in predetermined relation to the performance of the respective operations whereby said signals are concurrent when the operations are in register, means for continuously comparing the signals to determine their order of occurrence and produce an output error impulse as a function of mis-register, mis-register correcting means, first electrical connecting means between said comparing means and said mis-register correcting means whereby to control the latter by said error impulses for atuomatically adjusting the relative position of said successive operations performed upon the web to obtain in-register condition of the operations, signal aligning means for adjusting the physical space relationship between said first and second signal producing means to keep the signals therefrom in coincidence regardless of the condition of register between said operations, second electrical connecting means between said comparing means and said signal aligning means and normally inoperative during the atuomatic control of register, switching means rendering said second connecting means operative and said first connecting means inoperative to enable said error signal to automatically control said signal aligning means, and means for manually controlling said mis-register correcting means while said second connecting means is operative, whereby manual establishment of in-register condition will be accompanied by automatic adjustment of said signal aligning means to cause concurrence of said first and second signals during a set-up period.

3. An automatic control system for maintaining in-register condition between separate operations performed successively on a moving web at locations spaced along its path of travel, and including first and second signal producing means responsive, respectively, to the occurrence of said successive operations and producing first and second signals which are concurrent when the operations are in register and are non-concurrent when the operations are not in register, means continuously comparing the signals to determine their concurrence and lack of concurrence and producing an output error impulse as a function of mis-register, mis-register correcting means normally responsive to said error signals whereby the latter cause automatic adjustment of the relation in which said operations are performed on the web to keep said operations in register, signal aligning means for adjusting the physical space relationship between said first and second signal producing means to obtain coincidence of the signals therefrom, first electrical connecting means between said comparing means and said mis-register correcting means whereby to operate the correcting means in response to said error signals, second electrical connecting means between said comparing means and said signal aligning means whereby to operate the latter in response to said error signals, switching means for rendering said first connecting means inoperative while rendering said second connecting means operative, and means for manually controlling said mis-register correcting means while said second electrical connecting means is operative, whereby manual establishment of in-register condition will cause automatic adjustment of said signal aligning means to keep said first and second signals in coincidence during a set-up period.

4. A system for maintaining a pre-established condition of register between separate periodic operations performed successively on a moving web, said system comprising a first signal producing means responsive to the occurrence of the first operation, a second signal producing means responsive to the occurrence of the second operation, at least one of said signal producing means having an adjustable physical space relationship with one of said first and second operations and thereby producing a signal having an adjustable time relationship with said one operation, mis-register correction means for adjusting the relationship between the operations and the moving web to maintain said condition of register, a comparator, the signals from both of said signal producing means being applied to said comparator and said comparator providing an output error signal as a function of the lack of the simultaneity of occurrence of said signals, the system being arranged normally to provide said pre-established condition of register when said signals occur simultaneously, the mis-register correction means being normally connected to be energized by and being operatively responsive to said output error signal whereby said condition of register is automatically maintained, signal synchronizing means for adjusting said physical space relationship of said one of said first and second signal producing means operatively responsive also to said output error signal, but normally not connected to be energized thereby, and means for use during set-up of said system for removing the error signal from the mis-register correction means and applying said error signal to said signal synchronizing means so as to automatically maintain signal simultaneity during manual operation of said mis-register correction means.

5. A system for automatically maintaining a pre-established condition of register between separate operations performed successively on a moving web, said system comprising a first signal producing means responsive to the occurrence of the first of said operations, a second signal producing means responsive to the occurrence of the second of said operations, said first and second means producing signals during automatic control which occur simultaneously when said operations are performed in register and which are non-concurrent during mis-register, comparing means for determining the order of occurrence of said signals and providing output error impulses as a function of mis-register, mis-register correcting means normally responsive to said error impulses for automatically maintaining the pre-established register condition, signal aligning means responsive, upon selection, to said error impulses for adjusting said signals to coincidence regardless of the prevailing condition of register, switching means for selectively directing the error impulses from said comparing means either to the correcting means or to the signal aligning means, and means operative during direction of the error impulses to the signal aligning means for manually controlling the correcting means, whereby, while the desired condition of register is being manually established, said error impulses cause operation of the signal aligning means to keep said signals in coincidence.

6. In an automatic control system for apparatus comprising first operating means performing a first periodically repeating operation upon a moving web, second operating means performing a second periodically repeating operation upon said moving web, means for adjusting the register relationship of the operations to a desired condition, first and second signal producing means producing signals respectively related time-wise to the operations and adapted to coincide for said desired condition of register, means for receiving the signals and providing a pulse output as a function of the lack of coincidence of the signals, and a first feedback path applying the pulse output to the register relationship adjusting means to continuously and automatically correct for variations from said desired condition, means for manually operating said register relationship adjusting means, means for varying the time-wise relationship of at least one of said signals with said operations, a second feedback path for applying the pulse output to the last-mentioned means, and switch means establishing one or the other of said feedback paths, whereby during manual operation of said register relationship adjusting means the signals will automatically and continuously be maintained coincident.

7. An automatic control system for maintaining in-register condition of physical changes applied to a moving web periodically and continuously, and comprising a first station having first applying means thereat and a second station having second applying means thereat and the stations having a predetermined spaced apart relation along the web and applying respective physical changes to said web, a first electrical signal producing device and a second electrical signal producing device, one of the devices being operated as a result of one of the physical changes whereby the signal produced is synchronized with the passage of said place on said web at which said one physical change has been applied relative to said one signal producing device, the other of said signal producing devices being operated by the means applying the other of said physical changes whereby the signal produced thereby has a predetermined relation with the operation of said second applying means, register control means capable of being manually and automatically operated for adjusting the said predetermined spaced relation to said in-register condition, signal comparing means having the said signals fed thereto and producing an output related to said signals such that upon coincidence there is no output and upon non-coincidence there is an output polarized as to the direction of non-coincidence, actuating means for varying the relative position between said other signal producing device and said other applying means to change the time-relation between the occurrence of said signals independent of the condition of register, the said output being normally applied to the register control means to maintain in-register condition automatically, and means for diverting said output from said register control means and applying said output to said actuating means so as to automatically maintain signal coincidence during manual operation of said register control means.

References Cited in the file of this patent
UNITED STATES PATENTS

| | | |
|---|---|---|
| 2,497,909 | Poole | Feb. 21, 1950 |
| 2,518,325 | Hurley | Aug. 8, 1950 |
| 2,627,596 | Andrews | Feb. 3, 1953 |